(12) United States Patent
Sawdy et al.

(10) Patent No.: US 6,351,831 B1
(45) Date of Patent: Feb. 26, 2002

(54) STORAGE NETWORK CABLING VERIFICATION SYSTEM

(75) Inventors: Don Sawdy; Arthur L. Rogers, both of San Jose, CA (US)

(73) Assignee: MTI Technology Corporation, Anaheim, CA (US)

( * ) Notice: Subject to any disclaimer, the term of this patent is extended or adjusted under 35 U.S.C. 154(b) by 0 days.

(21) Appl. No.: 09/578,830

(22) Filed: May 24, 2000

(51) Int. Cl.[7] .................................................. H02H 3/05
(52) U.S. Cl. .............................. 714/48; 709/1; 711/114
(58) Field of Search ..................... 714/48, 6; 711/114; 709/1; 710/3; 712/10

(56) References Cited

U.S. PATENT DOCUMENTS

| 5,619,642 A |   | 4/1997 | Nielson et al. ........ 395/182.04 |
| 5,835,700 A | * | 11/1998 | Carbonneau et al. ......... 714/44 |
| 5,890,214 A |   | 3/1999 | Espy et al. ................. 711/114 |
| 6,047,353 A |   | 4/2000 | Vishlitzky et al. ........... 711/111 |
| 6,076,142 A | * | 6/2000 | Corrington et al. .......... 711/114 |
| 6,192,027 B1 | * | 2/2001 | El-Batal ...................... 370/222 |
| 6,192,481 B1 | * | 2/2001 | Deenadhayalan et al. ... 713/324 |

* cited by examiner

*Primary Examiner*—Robert Beausoleil
*Assistant Examiner*—Rita A Ziemer
(74) *Attorney, Agent, or Firm*—Townsend and Townsend and Crew LLP

(57) ABSTRACT

A method and apparatus for determining proper cabling and identical device locations between two controllers in a RAID system. Each controller first obtains the port names to which it is attached. The list is then reviewed to determine that there are no duplicate entries. Once this step is completed, the controllers exchange their port name lists. The lists are compared to make sure they exactly match. Finally, the controllers exchange a map of the devices themselves present on two channels. The exchange device maps are compared and must be equal. The two device maps being equal indicate that each storage device is logged on to the network through both I/O ports and is available to each controller.

10 Claims, 6 Drawing Sheets

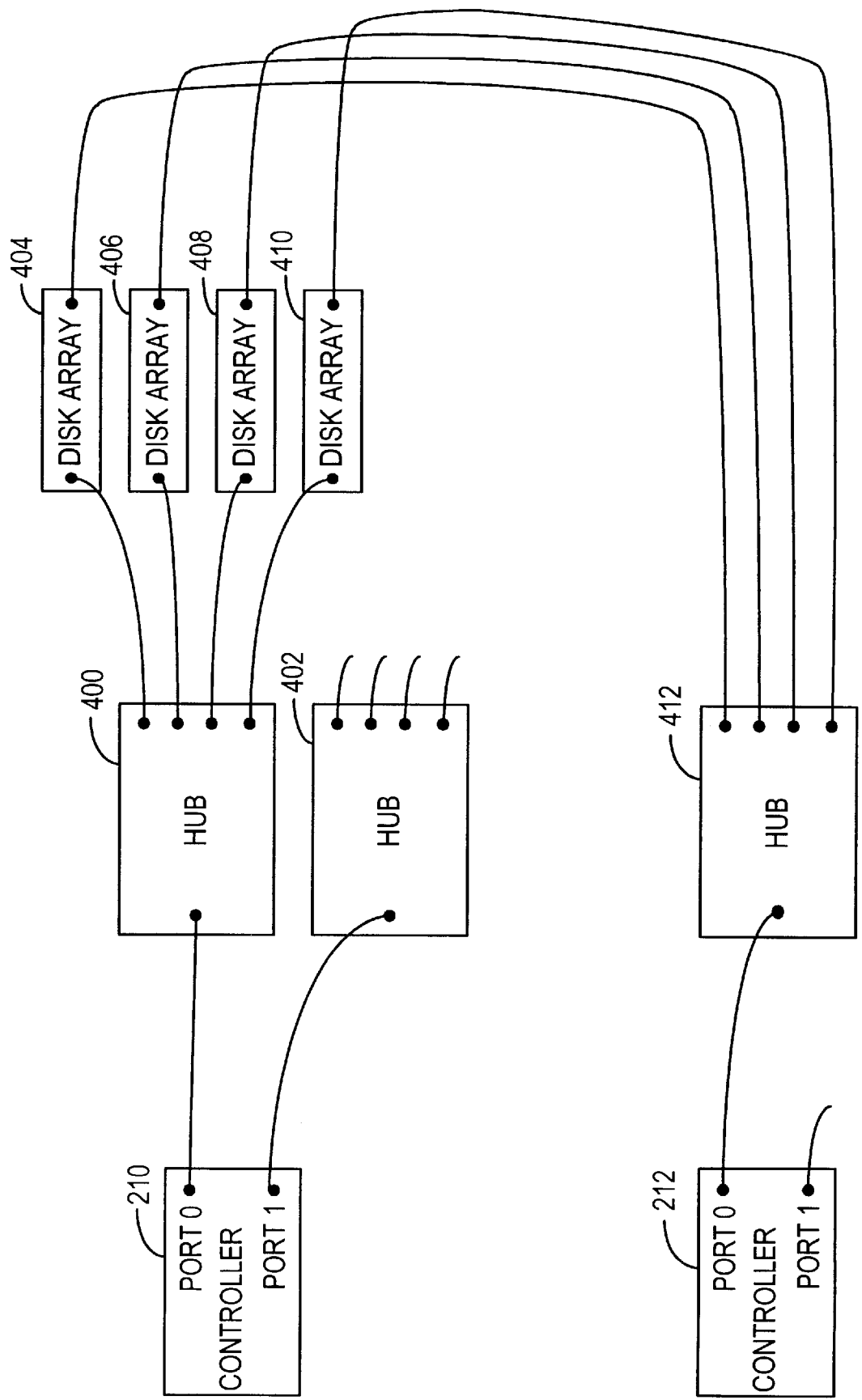

STORAGE NETWORK CABLING VERIFICATION SYSTEM

BACKGROUND OF THE INVENTION

The present invention relates to redundant arrays of independent disks (RAID), and in particular to mechanisms for cabling two controllers to the same disk drives.

In RAID systems, often two different controllers are each connected to the same group of disk drives for redundancy. In a typical configuration, each controller is coupled to a number of hubs. Each of the hubs may be connected to up to four disk drive enclosures. Each enclosure can include as many as twelve disk drives. Since both controllers need to connect to the same disk drives, the hubs must connect to the same enclosures, thus multiple connections are required. Because the significant amount of cabling involved, there is the possibility for cabling errors in connecting the disk drives.

In a typical configuration, each enclosure of twelve disk drives will have one or two disk drives that include SCSI enclosure services (SES). This capability essentially allows the SES device to poll the other devices in the enclosure to determine their identities and slot assignments, as well as other configuration data.

It would be desirable to be able to automatically determine that the cabling is correct such that each of two redundant controllers identifies the same disk drives in the same locations to facilitate a smooth transition of control from one controller to the other.

SUMMARY OF THE INVENTION

The present invention provides a method and apparatus for determining proper cabling and identical device locations between two controllers in a RAID system. Each controller first obtains the port names of the devices to which it is attached. The list is then reviewed to determine that there are no duplicate entries. Once this step is completed, the controllers exchange their port name lists. The lists are compared to make sure they exactly match. Finally, the controllers exchange a map of the devices themselves present on two channels connected to the ports. The exchange device maps are compared and must be equal. The two device maps being equal indicate that each storage device is logged on to the network through both I/O ports and is available to each controller.

In a preferred embodiment, the port names in the first steps are the ports of at least one, and preferably two, SES polling devices in each disk drive enclosure. The SES polling devices themselves determine the identity of the devices in their enclosures, and pass this along to the controllers.

For a further understanding of the nature and advantages of the invention, reference should be made to the following description taken in conjunction with the accompanying drawings.

BRIEF DESCRIPTION OF THE DRAWINGS

FIG. 4 is a diagram illustrating the cabling of disk arrays through hubs according to an embodiment of the invention.

DESCRIPTION OF THE SPECIFIC EMBODIMENTS

Enclosure

Figure 1:
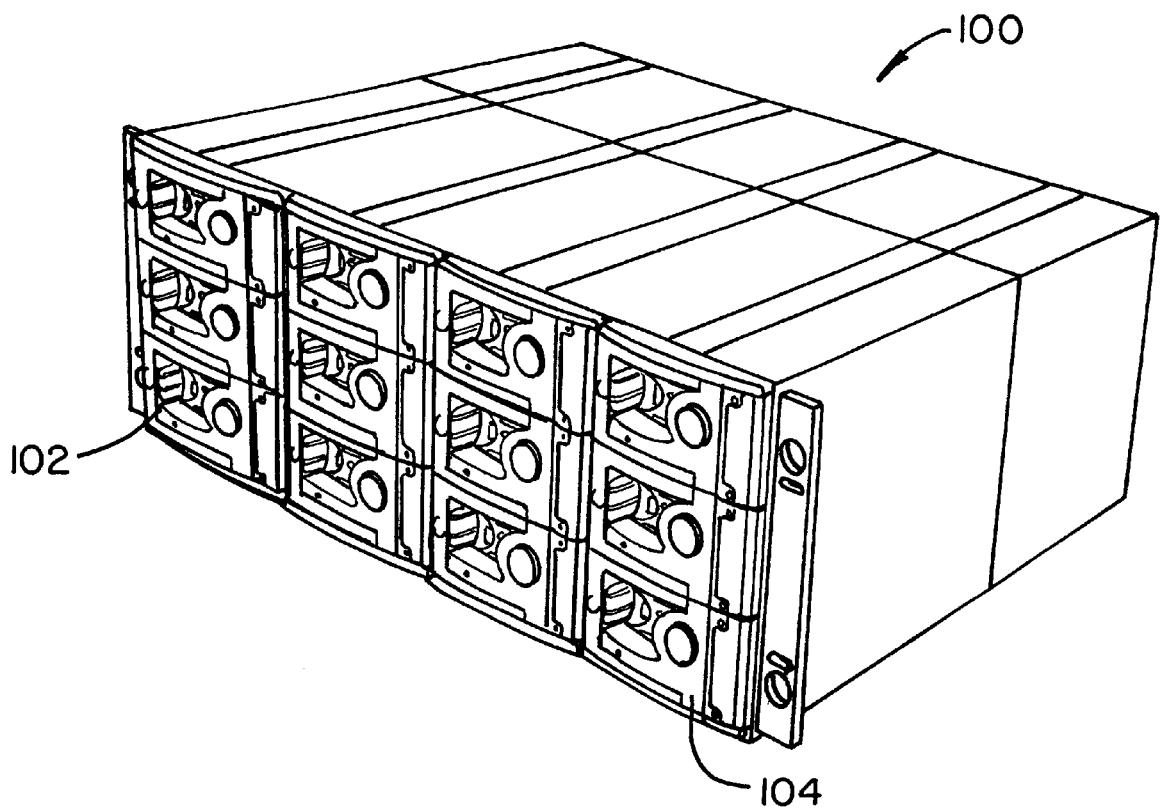
FIG. 1 illustrates an enclosure of disk drives used in the invention.

FIG. 1 illustrates an enclosure 100 having 12 disk drives mounted in slots in the enclosure. In one embodiment, a disk drive 102 and a disk drive 104 support the SCSI enclosure services (SES) protocol. These two disk drives are attached to two loops which connects them to the other disk drives in enclosure 100.

Dual Controller Connections to Drives

Figure 2:
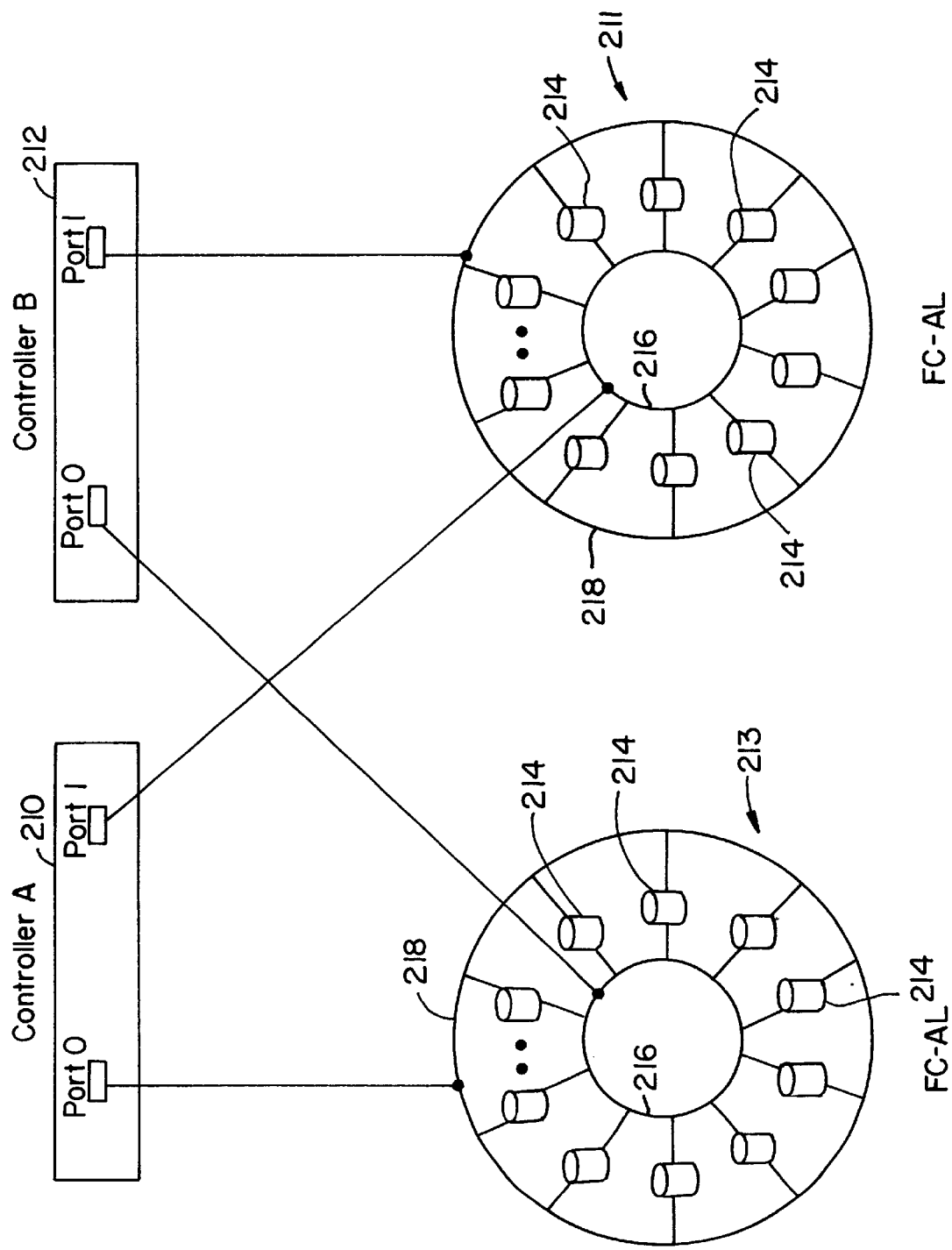
FIG. 2 is a block diagram illustrating the connection of multiple disk drives to two controllers.

FIG. 2 is a diagram illustrating the connection of two controllers (210, 212) to the same disk drives (214). The portion of each controller shown is the fibre channel port interface to the fibre channel cable attached to an enclosure port. In one embodiment, each circular diagram represents an enclosure (211, 213), which contains 12 disk drives. The drives have dual fibre channel ports, represented by the inner (216) and outer (218) circles.

The drive addresses in each enclosure are assigned by the enclosure and are based on the setting of a range switch within the enclosure. The range switch settings for all enclosures on an individual fibre channel loop are unique to ensure unique drive addresses on the loop.

Controller Block Diagram

Figure 3:
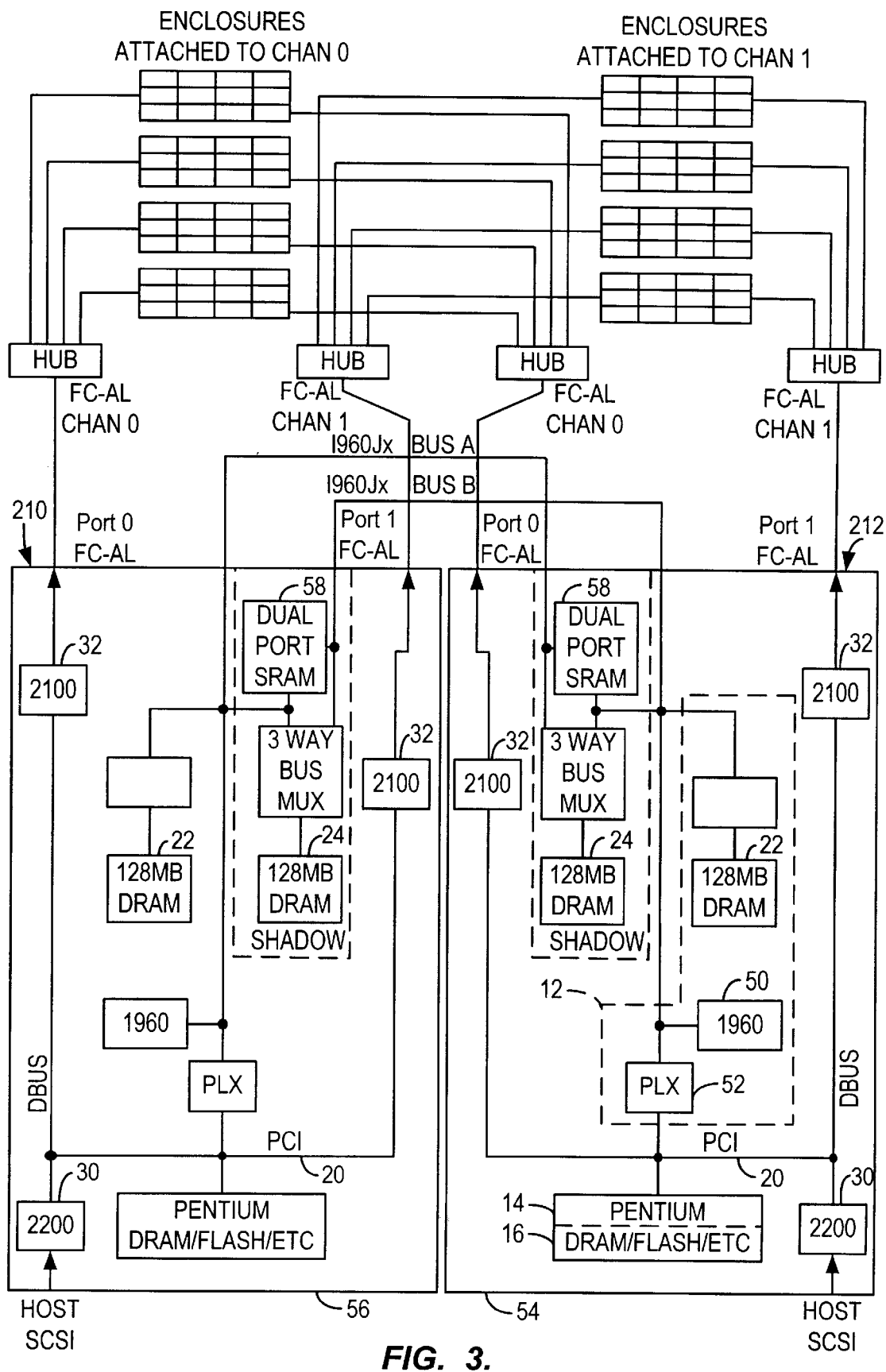
FIG. 3 is a block diagram of the two controllers of FIG. 2.

FIG. 3 is a block diagram of one embodiment of the controllers 210 and 212 of FIG. 2.

As can be seen, data flow is provided through two different host Fibre Channel (FC) interfaces 30 to the disk drives 214. Each host interface 30 communicates with two RAID interfaces 32 over PCI busses 20. Data is staged in-between them in a buffer memory 22. Shadow buffer memories 24 are provided for redundancy.

A RAID engine controller 50 is used for generating RAID functions. Microprocessor 14 performs program operations, and then the particular operation codes are transmitted across PCI bus 20 through PLX interface 52 to controller 50.

Cabling System

FIG. 4 illustrates a typical cabling system used in the present invention. Controllers 210 and 212 each have two ports or channels, port 0 and port 1. As shown in FIG. 4, port 0 of controller 210 is connected to a hub 400, while port 1 is connected to a hub 402. Hub 400 is in turn connected to four disk array enclosures 404, 406, 408, and 410. Hub 402 would be similarly connected to another four enclosures (not shown).

In one embodiment, the controller uses fibre channel, and there are 12 drives in each enclosure. Through the use of two hubs, up to eight enclosures can be attached to each controller for a total of 96 disk drives. Each disk drive has dual input/output ports. This allows connection also to a second controller 212, through a hub 412, for example.

The connection of eight enclosures to two controller boards requires 20 fibre channel cables and four fibre channel hubs. In addition, each enclosures features an 8-position switch that must be set during installation. This switch controls the device address assigned to each device. Installation errors may occur when setting switches and cabling the enclosures, hubs and controllers. In addition, it is necessary that the dual port feature of the disk drives be functional.

The correctness of the cabling and operation of the device dual port feature is of primary importance for proper network operation. Cabling errors can enable a device to be "present" as more than one device to a single controller. Also, devices assigned an address by one controller may be assigned an unrelated address by the partner controller or not known at all. Should the partner controller fail, for the surviving controller to assume the work of the controller pair, both controllers must have assigned each device to the same address (physical address) in the network.

Cabling Verification

During the bootup process, firmware in the controller performs a procedure to verify that the cabling from the controller boards to the enclosures is correctly installed. Consistent device logging on the network is also verified. The procedure relies on the fact that each drive has a unique factory-assigned "port name" which is available to the firmware. Each enclosure contains two drives that support the SES protocol. The SES devices are chosen, and the system is inherently aware of the enclosure in which they reside.

Figure 5A:
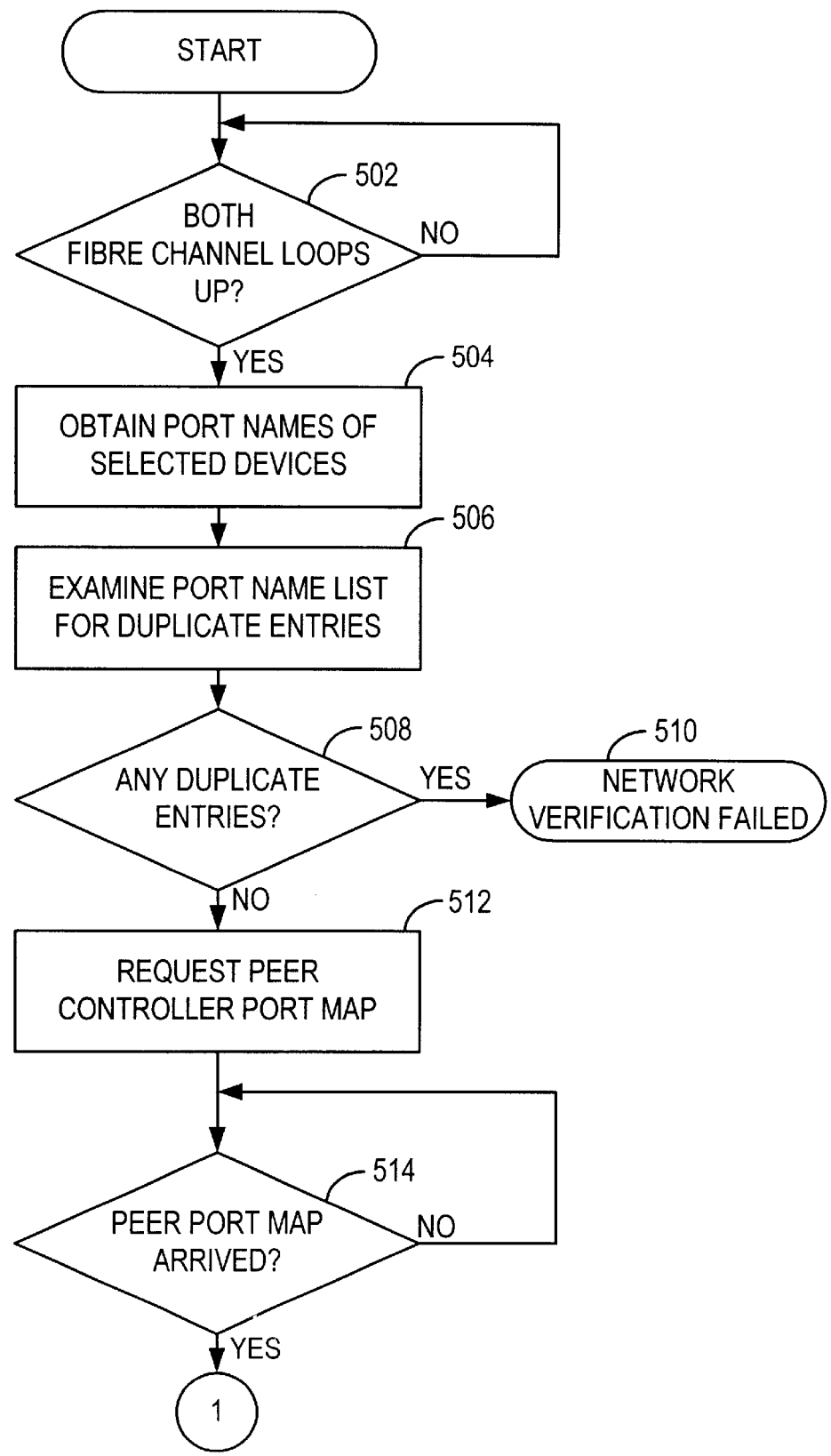
FIGS. 5A–5B are a flowchart illustrating the operation of a preferred embodiment of the invention.
Figure 5B:
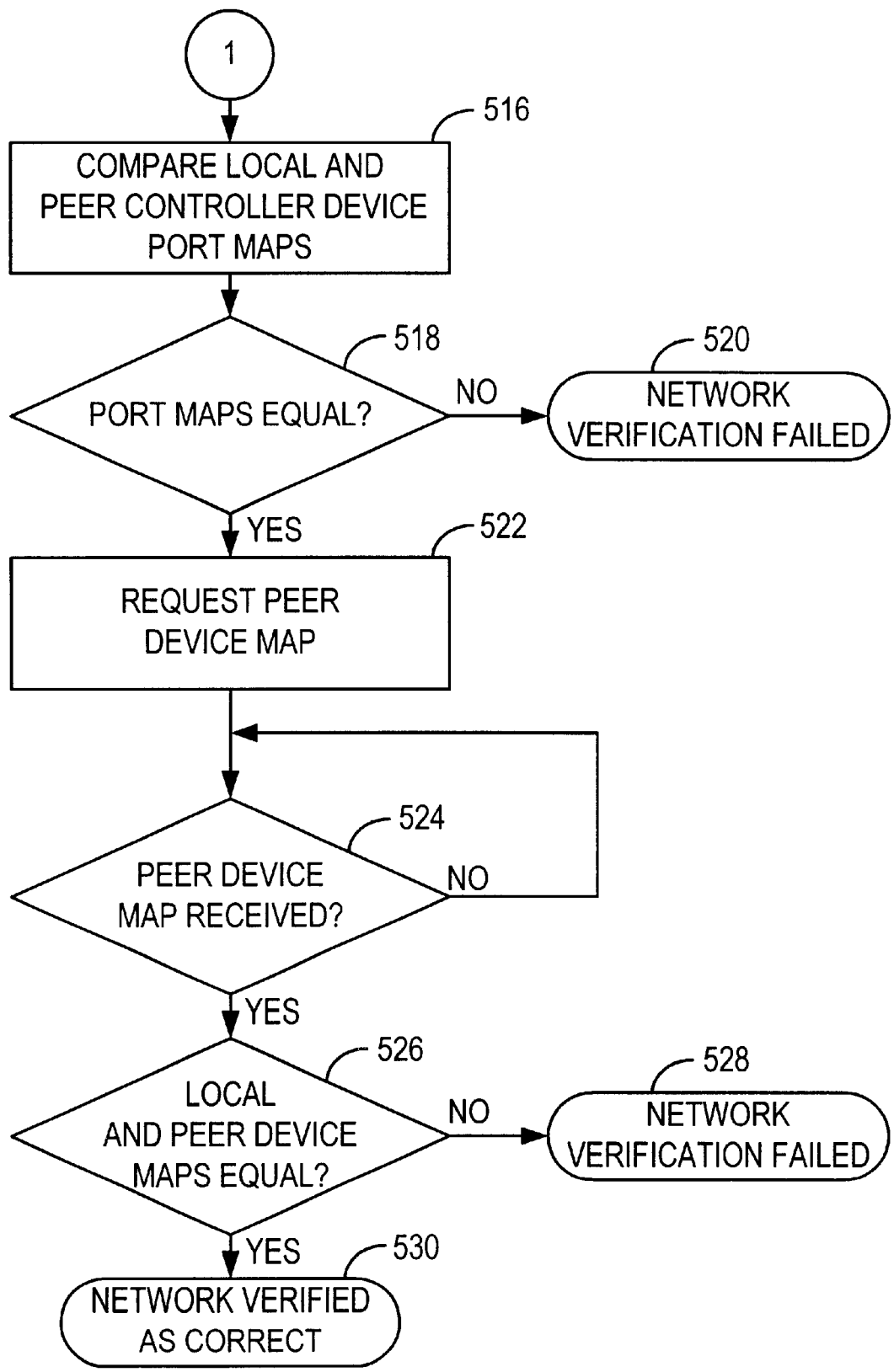

The procedure has the following steps, shown in FIGS. 5A–5B. First, it is verified that both fibre channel loops are up and operating (Step 502). Next, the port names of selected devices are obtained (Step 504). Preferably, these are the port names of the two SES polling devices in each enclosure. A list is then created in I/O channel/enclosure switch order. The list is then examined to ensure that each port name occurs only once in the list (Step 506). If there are any duplicate entries (Step 508) the network verification fails (Step 510). For this process to be successful in the preferred embodiment, there must be at least one SES device installed in each enclosure.

Next, the controllers exchange their port name list. This is accomplished by each controller requesting the port map from its peer (Step 512) and waiting until that peer port map has arrived (Step 514). When the map is received, the local and peer controller device maps are compared (Step 516). The lists must be equal, in other words have the same number of entries and the entries must be equal and in the same order (Step 518). If they are not, the network verification fails (Step 520).

After the port map test, the devices themselves are compared. The controllers exchange a map of devices by first requesting the peer map device (Step 522) and then waiting until the peer map device map is received (Step 524). If the local and peer device maps are not equal (Step 526), there is again a network verification failure (Step 528). If the maps are equal, the network is verified as correct (Step 530). The two device maps being equivalent indicates that each storage device is logged onto the network through both I/O ports and is available to each controller, with each controller having the same location indicated for the same device.

In the SES protocol, device presence is sensed by accessing the status code nibbles in each element status field for each device slot. The device present is shown by the status code "01H". Other status codes could show that it is unrecoverable, not installed or not available. Not available is set after enclosure power-on reset prior to updating this element. For FC-AL devices, the target address for a particular slot position can be sensed by accessing the "slot address" field within a device element. Further details of the SES operation can be obtained from the SCSI-3 Enclosure Services Command Set Specification, such as Rev 8a, dated Jan. 16, 1997, a working draft proposed by the American National Standard for Information Systems (dpANS X3.xxx-1997 X3T10/Project 1212-D/Rev 8a).

The invention thus allows faster device availability after a fail-over. This is significant since some systems have a time-out, and require manual intervention, if the devices don't become available within a time-out period.

As will be understood by those of skill in the art, the present invention may be embodied in other specific forms without departing from the essential characteristics thereof. For example, devices other than a SES protocol devices could be chosen to monitor devices in the configuration. These devices are not restricted to FC-AL type devices. Alternately, the comparisons could be done in a separate maintenance or host processor, rather than the redundant controller. The invention can also be used with any number of N controllers and M devices. The devices could be connected by other than a FC-AL, such as by a SCSI interface. Accordingly, the foregoing description is intended to be illustrative, but not limiting, of the scope of the invention which is set forth in the following claims.

What is claimed is:

1. In a RAID system having first and second, redundant RAID controllers, each cabled to the same plurality of memory devices, a method for verifying proper cabling, comprising:

obtaining, in said first RAID controller, a first plurality of port names;

reviewing said first plurality of port names for duplicate entries;

indicating a failure if there are any duplicate entries in said first plurality of port names;

obtaining, in said second RAID controller, a second plurality of port names;

reviewing said second plurality of port names for duplicate entries;

indicating a failure if there are any duplicate entries in said second plurality of port names;

comparing said first and second plurality of port names;

indicating a failure if said first and second plurality of port names do not exactly match;

obtaining, in said first controller, a map of devices connected to said first controller;

obtaining, in said second controller, a map of devices connected to said second controller;

comparing said first and second device maps; and indicating a failure if said first and second device maps do not exactly match.

2. The method of claim 1 wherein said comparings are performed in each of said first and second controllers.

3. The method of claim 1 wherein said port names comprise a subset of a group of devices, each of said port names corresponding to a port coupled to a remainder of said group of devices.

4. The method of claim 3 wherein said port names correspond to SES devices.

5. The method of claim 4 wherein at least one SES device is mounted in each of a plurality of device enclosures.

6. The method of claim 4 wherein each said SES devices shares an enclosure with a plurality of disk drives in a plurality of slots of said enclosure, and each said SES devices polls said plurality of disk drives in said enclosure to determine a device identity in each slot.

7. The method of claim 1 wherein said devices are disk drives.

8. The method of claim 1 wherein there are N controllers and M devices.

9. The method of claim 1 wherein said comparings are performed in a maintenance or host processor.

10. In a RAID system having first and second, redundant RAID controllers, each cabled to the same plurality of memory devices, a method for verifying proper cabling, comprising:

obtaining, in said first RAID controller, a first plurality of port names;

reviewing said first plurality of port names for duplicate entries;

indicating a failure if there are any duplicate entries in said first plurality of port names;

obtaining, in said second RAID controller, a second plurality of port names;

reviewing said second plurality of port names for duplicate entries;

indicating a failure if there are any duplicate entries in said second plurality of port names;

exchanging, between said first and second controllers, said first and second plurality of port names;

comparing, in at least one of said first and second controllers, said first and second plurality of port names;

indicating a failure if said first and second plurality of port names do not exactly match;

obtaining, in said first controller, a map of devices connected to said first controller;

obtaining, in said second controller, a map of devices connected to said second controller;

exchanging, between said first and second controllers, said first and second device maps;

comparing, in at least one of said first and second controllers, said first and second device maps; and indicating a failure if said first and second device maps do not exactly match.

* * * * *